United States Patent
Langley et al.

(10) Patent No.: US 10,853,159 B1
(45) Date of Patent: Dec. 1, 2020

(54) ANALYSIS SYSTEM AND METHOD

(71) Applicant: EMC IP Holding Company, LLC, Hopkinton, MA (US)

(72) Inventors: Charles S. Langley, Parker, CO (US); Michael G. Varteresian, Lexington, MA (US); Muzhar Khokhar, Shrewsbury, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 76 days.

(21) Appl. No.: 15/497,465

(22) Filed: Apr. 26, 2017

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01)

(58) Field of Classification Search
CPC . G06F 11/0709; G06F 11/0751; G06F 11/079
See application file for complete search history.

(56) References Cited

U.S. PATENT DOCUMENTS

| | | | |
|---|---|---|---|
| 2006/0242288 A1* | 10/2006 | Masurkar | G06F 11/0709 709/223 |
| 2010/0229023 A1* | 9/2010 | Gross | G06F 11/0724 714/2 |
| 2016/0258845 A1* | 9/2016 | Mankovskii | G01M 99/008 |
| 2017/0187570 A1* | 6/2017 | Estrada | H04L 41/0695 |
| 2018/0060150 A1* | 3/2018 | Cunico | G06F 11/079 |
| 2018/0150256 A1* | 5/2018 | Kumar | G06F 21/57 |
| 2018/0173601 A1* | 6/2018 | Tafas | G06F 11/3006 |
| 2018/0260268 A1* | 9/2018 | Madsen | G06F 11/0727 |

* cited by examiner

*Primary Examiner* — Joshua P Lottich
(74) *Attorney, Agent, or Firm* — Brian J. Colandreo; Mark H. Whittenberger; Holland & Knight LLP

(57) ABSTRACT

A method, computer program product, and computing system for generating a tagged telemetry data portion concerning a storage system. The tagged telemetry data is processed via one or more heath check microservices to generate one or more tagged health packets. The one or more tagged health packets are processed via one or more health awareness microservices to generate one or more health awareness results.

21 Claims, 4 Drawing Sheets

ANALYSIS SYSTEM AND METHOD

TECHNICAL FIELD

This disclosure relates to analysis systems and methods and, more particularly, to analysis systems and methods for use within a storage environment.

BACKGROUND

Storing and safeguarding electronic content is of paramount importance in modern business. Accordingly, various methodologies may be employed to protect and distribute such electronic content. For example, high-availability, storage systems may be utilized to provide users with access to applications and high-availability storage that may be custom tailored to the needs and desires of the user. Unfortunately, the health of such high-availability storage systems may become compromised. Accordingly, diagnostics tools may need to be employed to ensure the continued efficient operation of such high-availability storage systems.

SUMMARY OF DISCLOSURE

In one implementation, a computer-implemented method is executed on a computing device and includes generating a tagged telemetry data portion concerning a storage system. The tagged telemetry data portion is processed via one or more heath check microservices to generate one or more tagged health packets. The one or more tagged health packets are processed via one or more health awareness microservices to generate one or more health awareness results.

One or more of the following features may be included. A plurality of untagged telemetry data portions may be received from the storage system. Generating the tagged telemetry data portion may include tagging an untagged telemetry data portion, chosen from the plurality of untagged telemetry data portions, to generate the tagged telemetry data portion. Generating the tagged telemetry data portion may include tagging a fictional telemetry data portion to generate the tagged telemetry data portion. The one or more health awareness results may be compared to one or more anticipated results to assess the functionality of the one or more heath check microservices and/or the one or more health awareness microservices. The tagged telemetry data portion may include a tagged telemetry data packet. The tagged telemetry data portion may be configured to exercise one or more of the heath check microservices and/or one or more of the health awareness microservices.

In another implementation, a computer program product resides on a computer readable medium and has a plurality of instructions stored on it. When executed by a processor, the instructions cause the processor to perform operations including generating a tagged telemetry data portion concerning a storage system. The tagged telemetry data portion is processed via one or more heath check microservices to generate one or more tagged health packets. The one or more tagged health packets are processed via one or more health awareness microservices to generate one or more health awareness results.

One or more of the following features may be included. A plurality of untagged telemetry data portions may be received from the storage system. Generating the tagged telemetry data portion may include tagging an untagged telemetry data portion, chosen from the plurality of untagged telemetry data portions, to generate the tagged telemetry data portion. Generating the tagged telemetry data portion may include tagging a fictional telemetry data portion to generate the tagged telemetry data portion. The one or more health awareness results may be compared to one or more anticipated results to assess the functionality of the one or more heath check microservices and/or the one or more health awareness microservices. The tagged telemetry data portion may include a tagged telemetry data packet. The tagged telemetry data portion may be configured to exercise one or more of the heath check microservices and/or one or more of the health awareness microservices.

In another implementation, a computing system includes a processor and a memory system configured to perform operations including generating a tagged telemetry data portion concerning a storage system. The tagged telemetry data portion is processed via one or more heath check microservices to generate one or more tagged health packets. The one or more tagged health packets are processed via one or more health awareness microservices to generate one or more health awareness results.

One or more of the following features may be included. A plurality of untagged telemetry data portions may be received from the storage system. Generating the tagged telemetry data portion may include tagging an untagged telemetry data portion, chosen from the plurality of untagged telemetry data portions, to generate the tagged telemetry data portion. Generating the tagged telemetry data portion may include tagging a fictional telemetry data portion to generate the tagged telemetry data portion. The one or more health awareness results may be compared to one or more anticipated results to assess the functionality of the one or more heath check microservices and/or the one or more health awareness microservices. The tagged telemetry data portion may include a tagged telemetry data packet. The tagged telemetry data portion may be configured to exercise one or more of the heath check microservices and/or one or more of the health awareness microservices.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
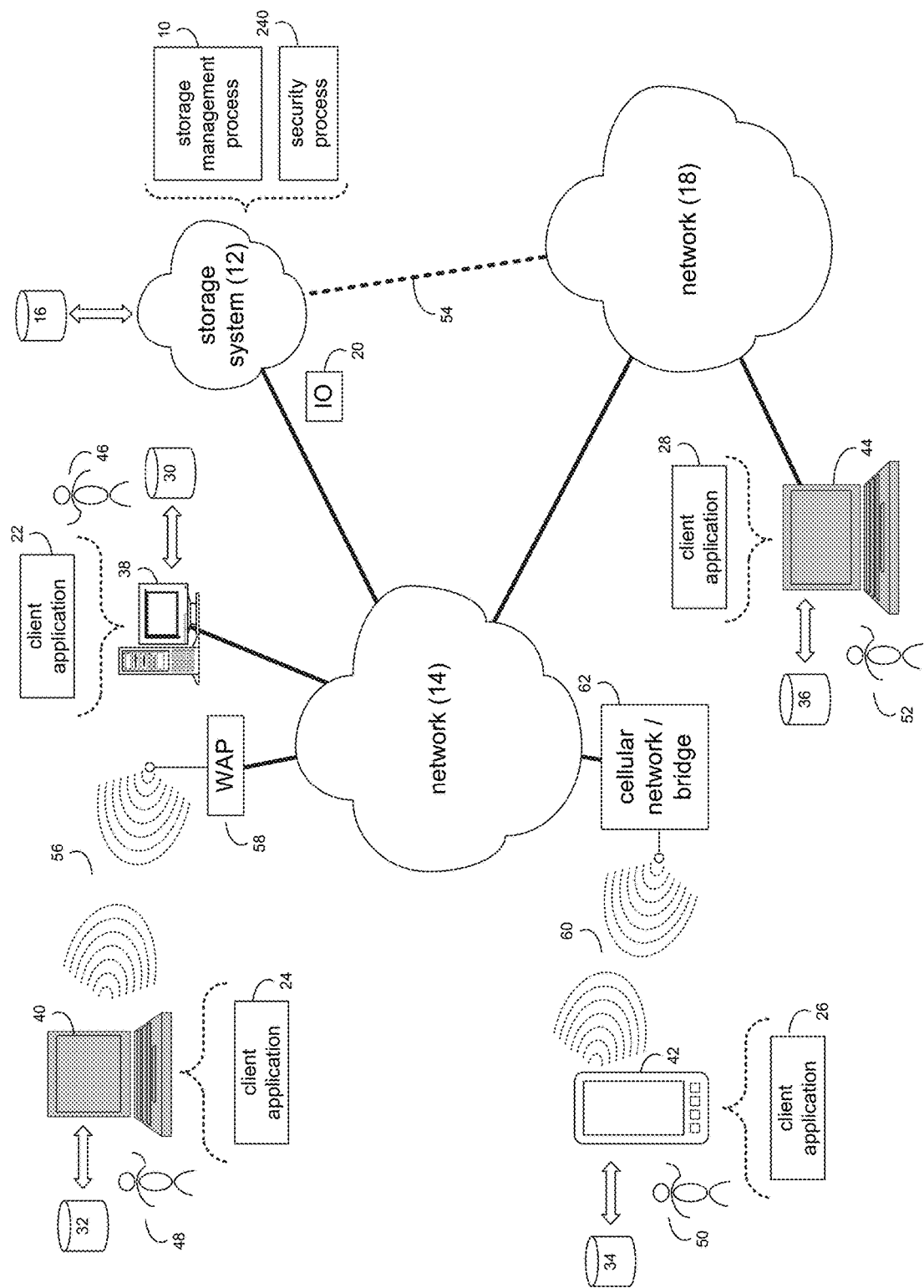
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
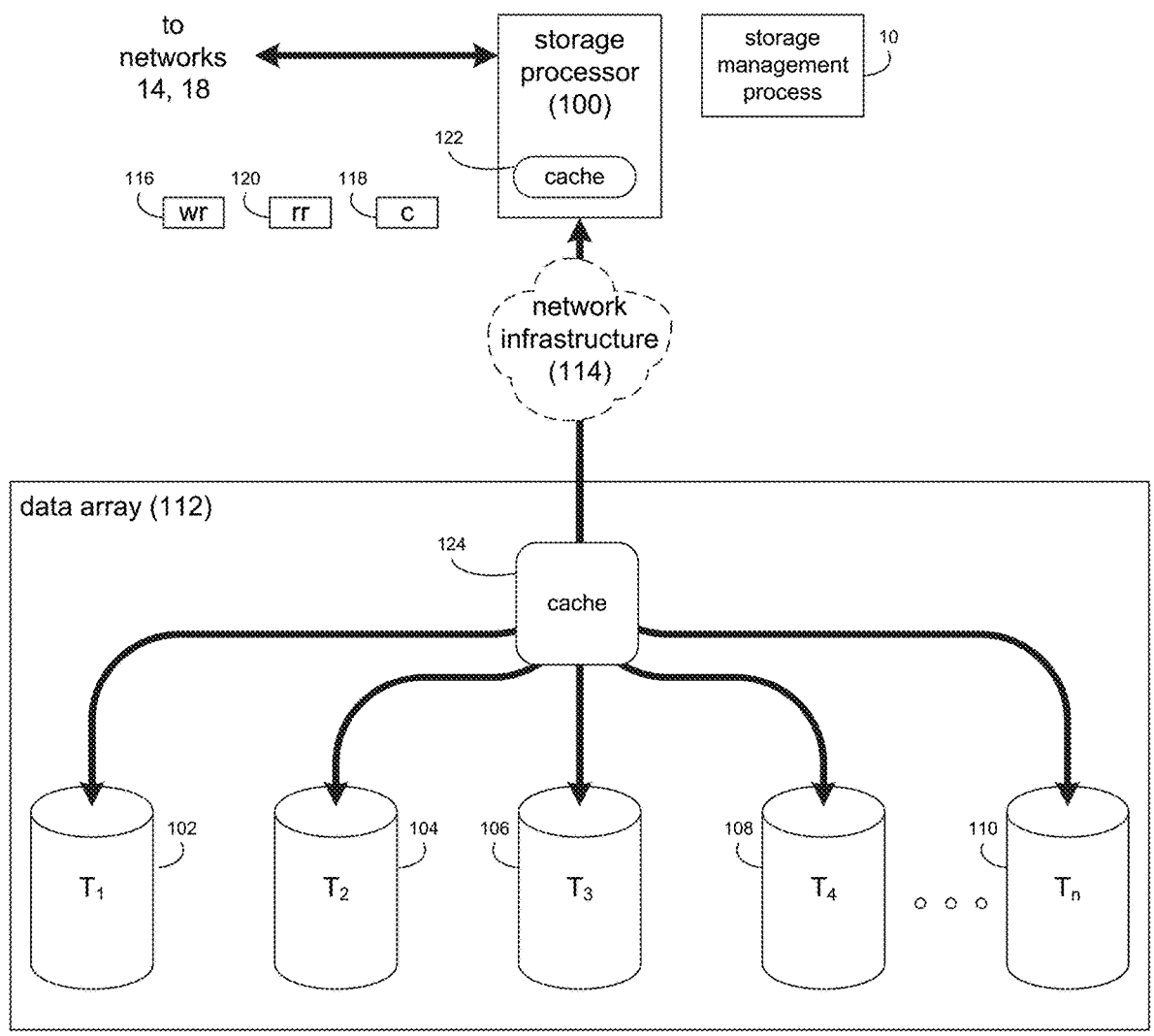
FIG. 2 is a diagrammatic view of an implementation of the storage system of FIG. 1.

Referring also to FIG. 2, there is shown one particular implementation of storage system 12. Storage system 12 may include storage processor 100 and a plurality of storage targets $T_{1-n}$ (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

Figure 3:
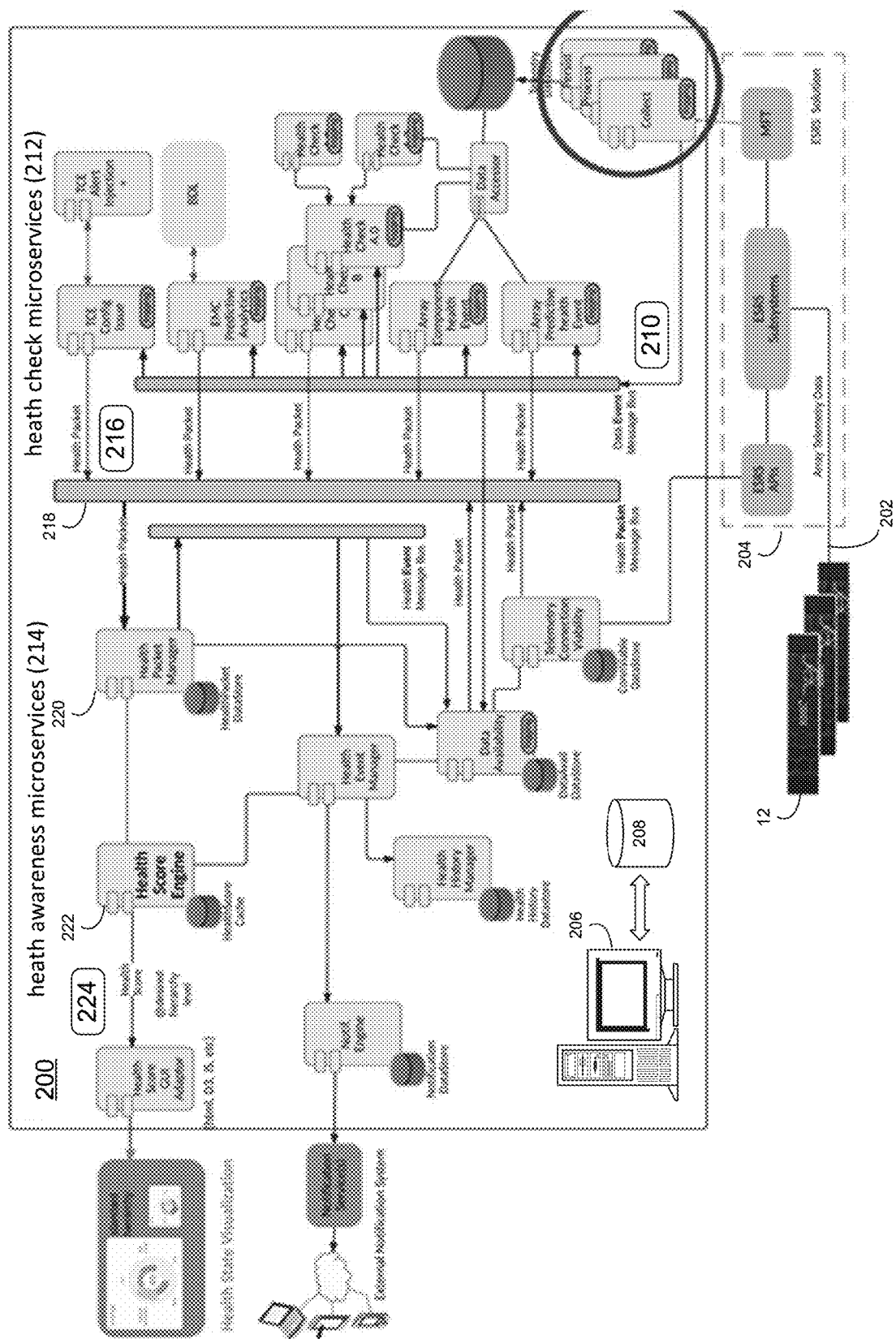
FIG. 3 is a diagrammatic view of a telemetry analysis process for analyzing telemetry data from the storage system of FIG. 1.
Figure 4:
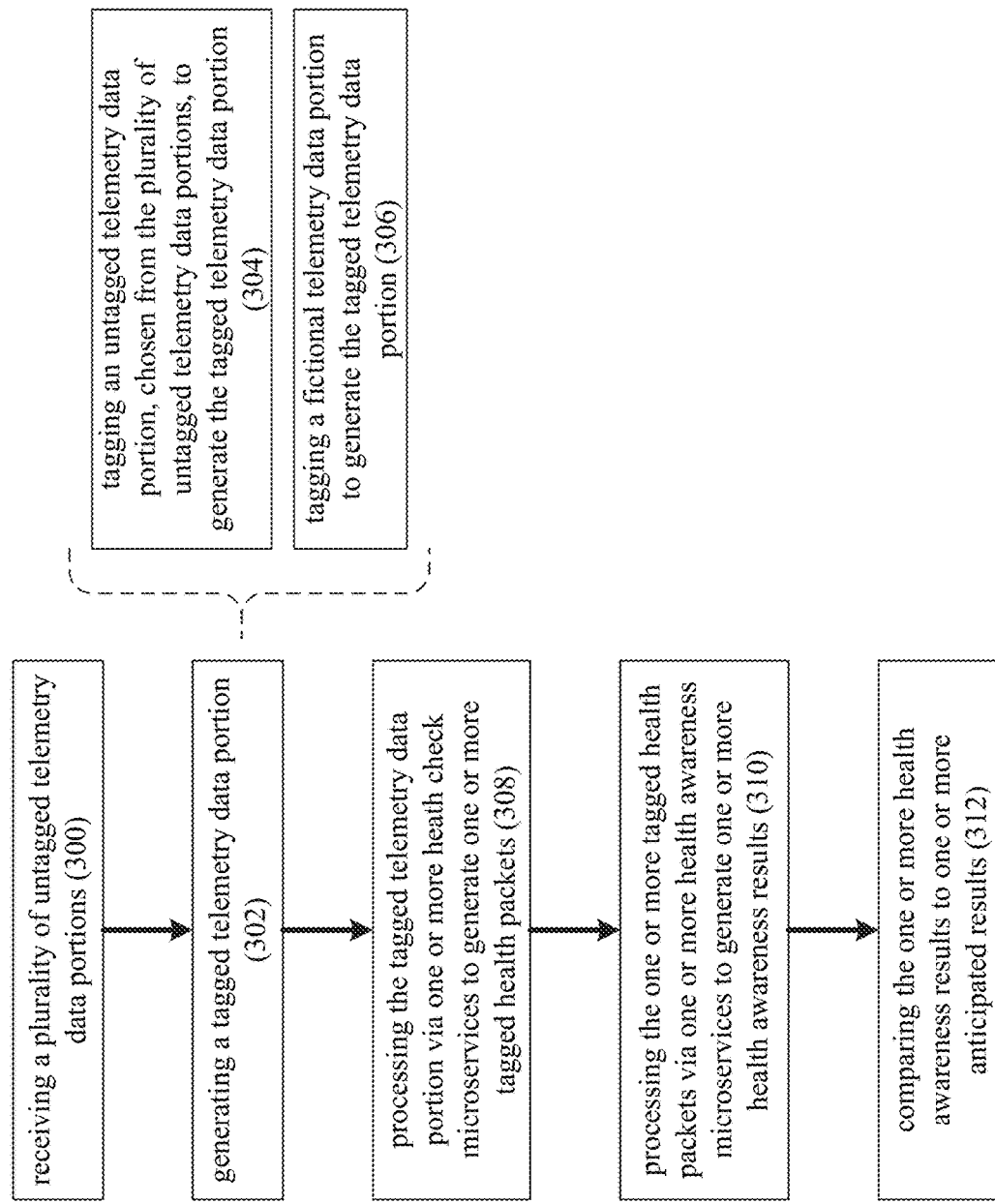
FIG. 4 is a flow chart of the telemetry analysis process of FIG. 3.

Telemetry Analysis:

Referring also to FIG. 3, there is shown telemetry analysis process 200 that may be configured to process telemetry data 202 received from storage system 12. As is known in the art, telemetry data 202 may be provided by an automated communication process embedded within storage system 12. Telemetry data 202 may be provided from storage system 12 to telemetry data handling subsystem 204 (an example of which may include but is not limited to the EMC Secure Remote Services), wherein telemetry data 202 may subsequently be provided to telemetry analysis process 200.

EMC Secure Remote Services is a highly secure, two-way remote connection between (in this example) storage system 12 and telemetry analysis process 200. EMC Secure Remote Services may provide a wide range of benefits and services, including: automated health checks to ensure that storage system 12 is at optimal performance; predictive wellness monitoring and notification for storage system 12; and remote issue analysis and diagnosis of storage system 12, wherein these services may be available via a remotely accessible dashboard that is configured to access telemetry analysis process 200.

Telemetry analysis process 200 may be a cloud-based solution that is executed on computing device 206. Examples of computing device 206 may include, but are not limited to: a personal computer, a server computer, a series of server computers, a mini computer, a mainframe computer, or a cloud-based computing network. The instruction sets and subroutines of telemetry analysis process 200, which may be stored on a storage device (e.g., storage device 208) coupled to computing device 206, may be executed by one or more processors (not shown) and one or more memory architectures (not shown) included within computing device 206. Storage device 208 may include but is not limited to: a hard disk drive; a tape drive; an optical drive; a RAID device; a random access memory (RAM); a read-only memory (ROM); and all forms of flash memory storage devices.

As discussed above, telemetry data 202 may be provided from storage system 12 to telemetry data handling subsystem 204 (e.g., EMC Secure Remote Services). Telemetry data handling subsystem 204 may process telemetry data 202 in various ways. For example, telemetry data handling subsystem 204 my decrypt telemetry data 202 if initially encrypted. Additionally and as discussed above, telemetry analysis process 200 may be a cloud-based solution. Accordingly, telemetry data handling subsystem 204 may broadcast/provide telemetry data 202 to telemetry analysis process 200.

Continuing with the above stated example, telemetry analysis process 200 may receive 300 a plurality of untagged telemetry data portions (e.g., telemetry data 202) from storage system 12. Examples of telemetry data 202 may include but are not limited to general operation data, general condition data, general status data and general health data concerning storage system 12.

Telemetry analysis process 200 may generate 302 a tagged telemetry data portion (e.g., tagged telemetry data portion 210) concerning storage system 12. An example of tagged telemetry data portion 210 may include but is not limited to a tagged telemetry data packet. This tagged telemetry data portion (e.g., tagged telemetry data portion 210) may be distributed internally (i.e., within telemetry analysis process 200) and may be configured to exercise (e.g., to be utilized by and/or to be processed by) one or more of the microservices (e.g., health check microservices 212 and/or health awareness microservices 214) included within telemetry analysis process 200.

Accordingly and through the use of tagged telemetry data portion 210, the functionality and proper operation of the microservices (e.g., health check microservices 212 and/or health awareness microservices 214) included within telemetry analysis process 200 may be analyzed by monitoring the movement of tagged telemetry data portion 210 through telemetry analysis process 200, wherein the success of computing an accurate overall assessment of storage system 12 may depends upon the collaborative processing of these microservices (e.g., health check microservices 212 and/or health awareness microservices 214) included within telemetry analysis process 200.

As will be discussed below in greater detail, each of the microservices (e.g., health check microservices 212 and/or health awareness microservices 214) may monitor for the occurrence of tagged telemetry data portions (e.g., tagged telemetry data portion 210) and may respond to a tagged telemetry data portion by invoking enhanced levels of data logging. This enhanced level of data logging through the use of tagged telemetry data portion 210 may provide a methodology for observing how telemetry analysis process 200 processes and handles telemetry data 202. As will be discussed below in greater detail, tagged telemetry data portion 210 may be generated 302 in various ways.

Accordingly and when generating 302 tagged telemetry data portion 210, telemetry analysis process 200 may tag 304 an untagged telemetry data portion, chosen from the plurality of untagged telemetry data portions (e.g., telemetry data 202), to generate tagged telemetry data portion 210. For example, telemetry analysis process 200 may randomly select an untagged telemetry data portion (chosen from the plurality of untagged telemetry data portions) and may tag 304 this randomly-selected untagged telemetry data portion to generate tagged telemetry data portion 210.

Alternatively, telemetry analysis process 200 may analyze the plurality of untagged telemetry data portions and may select an untagged telemetry data portion (chosen from the plurality of untagged telemetry data portions) that would provide the result desired by telemetry analysis process 200. Telemetry analysis process 200 may then tag 304 this specifically-selected untagged telemetry data portion to generate tagged telemetry data portion 210. For example, if the purpose of tagging a telemetry data portion is to determine the functionality and proper operation of the microservices (e.g., health check microservices 212 and/or health awareness microservices 214) within telemetry analysis process 200 that concern storage device availability/unavailability, telemetry analysis process 200 may analyze the plurality of untagged telemetry data portions and may tag 304 an untagged telemetry data portion (chosen from the plurality of untagged telemetry data portions) that concerns storage device availability/unavailability to generate 302 tagged telemetry data portion 210

However, tagged telemetry data portion 210 need not be based upon a "real" telemetry data portion. For example and when generating 302 tagged telemetry data portion 210, telemetry analysis process 200 may tag 306 a fictional (i.e., made up) telemetry data portion to generate tagged telemetry data portion 210. For example, again assume that the purpose of tagging a telemetry data portion is to determine the functionality and proper operation of the microservices (e.g., health check microservices 212 and/or health awareness microservices 214) within telemetry analysis process 200 that concern storage device availability/unavailability. If telemetry analysis process 200 determines that none of the plurality of untagged telemetry data portions concern storage device availability/unavailability, telemetry analysis process 200 may generate a fictional telemetry data portion that concerns storage device availability/unavailability. Telemetry analysis process 200 may then tag 306 this fictional telemetry data portion to generate 302 tagged telemetry data portion 210

Continuing with the above-stated example and once tagged telemetry data portion 210 is generated 302, telemetry analysis process 200 may process 308 tagged telemetry data portion 210 via one or more heath check microservices (e.g., health check microservices 212) to generate one or more tagged health packets (e.g., health packets 216). For example, health check microservices 212 may perform logical analysis of (in this example) tagged telemetry data portion 210 to generate one or more tagged health packets (e.g., health packets 216).

Examples of devices on which such logical analysis may be performed may include but are not limited to Battery, Dae, Dpe, Disk Dae, Disk Dpe, Fan, Lcc, Memory Module, Ssc, Ssd, Storage Processor, Power Supply, Power 90, Power 95, Temperature 90, and Temperature 95.

Examples of the types of situations assessed may include but are not limited to Single Disk Fault Raid5 No Spare, Single Disk Fault Raid5 With Spare, Single Disk Fault Raid6 No Spare, Single Disk Fault Raid6 With Spare, Unused Disk Fault Spare Available, Unused Disk Fault Spare Not Available, Double Disk Fault Raid6 No Spare, Double Disk Fault Raid6 With Spare, Raid Group Faulted, and Hot Spare Policy.

Further examples of the types of analysis performed may include but are not limited to: the performing of logical analysis of the telemetry data related to storage pools on a storage array, wherein the system may detect degraded storage pools and may compute an impact of how much storage capacity is impacted by degraded pool(s).

Additional examples of the types of analysis performed may include but are not limited to: the performing of logical analysis of the telemetry data related to the connectivity status of hosts coupled to a storage array, wherein issues may be detected with iSCSI and fiber channel connectivity when each host initiator may not have a host initiator path logged into each storage processor.

Continuing with the above-stated example, if tagged telemetry data portion 210 concerns storage device availability/unavailability, the various heath check microservices (e.g., health check microservices 212) may process tagged telemetry data portion 210 to generate (in this example) health packets 216, which may also concern storage device availability/unavailability. Heath check microservices 212 may provide the one or more tagged health packets (e.g., health packets 216) to health packet message bus 218 so that they may be provided to health awareness microservices 214.

Telemetry analysis process 200 may process 310 the one or more tagged health packets (e.g., health packets 216) via one or more health awareness microservices (e.g., health awareness microservices 214) to generate one or more health awareness results 224. For example, health packet manager 220, which is a heath check microservices, may receive the one or more tagged health packets (e.g., health packets 216) from health packet message bus 218. Health packet manager 220 may provide the one or more tagged health packets (e.g., health packets 216) to health score engine 222 which may process the one or more tagged health packets (e.g., health packets 216) to assess the general health of storage system 12 (e.g., in the form of one or more health awareness results 224). Telemetry analysis process 200 may then compare 312 the one or more health awareness results 224 to one or more anticipated results to assess the functionality and operation of the microservices (e.g., health check microservices 212 and/or health awareness microservices 214) within telemetry analysis process 200.

For example and continuing with the above-stated example, assume that telemetry analysis process 200 generated 302 tagged telemetry data portion 210 to assess the functionality and proper operation of the microservices (e.g., health check microservices 212 and/or health awareness microservices 214) included within telemetry analysis process 200. Specifically, assume that tagged telemetry data portion 210 is a fictional data packet that was generated 302 by telemetry analysis process 200 to "fictitiously" indicate the failure of a storage device within storage system 12. Accordingly, as telemetry data portion 210 propagates through telemetry analysis process 200, the above-described enhanced level of data logging may occur to provide a methodology (through the use of tagged telemetry data portion 210) for observing how telemetry analysis process 200 generally processes telemetry data 202. For example, as each of the microservices (e.g., health check microservices 212 and/or health awareness microservices 214) included within telemetry analysis process 200 processes telemetry data 202, data generated as a result of such processing may be logged and subsequently available for review/analysis.

Heath check microservices 212 of telemetry analysis process 200 may then generate one or more tagged health packets (e.g., health packets 216) that are provided to health awareness microservices 214, wherein health score engine 222 may generate health score 224. As tagged telemetry data portion 210 is a fictional data packet that was generated 302 by telemetry analysis process 200 to indicate the failure of a storage device within storage system 12, health score 224 should indicate such a degradation of the health of storage system 12. Accordingly, telemetry analysis process 200 may compare 312 health score 224 to one or more anticipated results (e.g., a degraded health score that is indicative of the failure of a storage device) to assess the functionality and proper operation of the microservices (e.g., health check microservices 212 and/or health awareness microservices 214) included within telemetry analysis process 200. In the event that this comparison 312 fails to show a correlation between health score 224 and the anticipated result (a degraded health score), one or more of the microservices (e.g., health check microservices 212 and/or health awareness microservices 214) included within telemetry analysis process 200 may be deemed to be malfunctioning. Accordingly and in such a situation, the above-described enhanced level of data logging may prove useful to determine the cause of the problem within the health check microservices 212 and/or health awareness microservices 214.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving of telemetry data from the storage system, wherein the telemetry data includes, at least in part, data related to at least one of availability and unavailability of a storage device;
   processing the telemetry data via one or more health check microservices;
   analyzing the telemetry data via the one or more health check microservices, wherein analyzing the telemetry data comprises analyzing one or more of one or more hardware components of the storage system, one or more RAID groups of the storage system, one or more storage pools of the storage system, and a connectivity status of a host configured to the storage system;
   generating based upon, at least in part, the results of analyzing the telemetry data, one or more health packets; and
   processing the one or more health packets via one or more health awareness microservices to generate one or more health awareness results concerning the storage system.

2. The computer-implemented method of claim 1 further comprising:
   receiving a plurality of untagged telemetry data portions from the storage system.

3. The computer-implemented method of claim 2 wherein further comprising:
   tagging an untagged telemetry data portion, chosen from the received plurality of untagged telemetry data portions, to generate a tagged telemetry data portion.

4. The computer-implemented method of claim 2 further comprising:
   tagging a fictional telemetry data portion to generate a tagged telemetry data portion.

5. The computer-implemented method of claim 1 further comprising:
   comparing the one or more health awareness results to one or more anticipated results to assess the functionality of the one or more health check microservices and/or the one or more health awareness microservices.

6. The computer-implemented method of claim 1 wherein the received telemetry data includes a tagged telemetry data packet.

7. The computer-implemented method of claim 1 wherein the received telemetry data is configured to exercise one or more of the health check microservices and/or one or more of the health awareness microservices.

8. A computer program product comprising a non-transitory computer readable medium having a plurality of instructions stored thereon which, when executed by a processor, cause the processor to perform operations comprising:
   receiving of telemetry data from the storage system, wherein the telemetry data includes, at least in part, data related to at least one of availability and unavailability of a storage device;
   processing the telemetry data via one or more health check microservices;
   analyzing the telemetry data via the one or more health check microservices, wherein analyzing the telemetry data comprises analyzing one or more of one or more hardware components of the storage system, one or more RAID groups of the storage system, one or more storage pools of the storage system, and a connectivity status of a host configured to the storage system;

generating based upon, at least in part, the results of analyzing the telemetry data, one or more packets; and processing the one or more packets via one or more health awareness microservices to generate one or more health awareness results concerning the storage system.

9. The computer program product of claim 8 further comprising:

receiving a plurality of untagged telemetry data portions from the storage system.

10. The computer program product of claim 9 wherein further comprising:

tagging an untagged telemetry data portion, chosen from the received plurality of untagged telemetry data portions, to generate a tagged telemetry data portion.

11. The computer program product of claim 9 wherein further comprising:

tagging a fictional telemetry data portion to generate a tagged telemetry data portion.

12. The computer program product of claim 8 further comprising:

comparing the one or more health awareness results to one or more anticipated results to assess the functionality of the one or more health check microservices and/or the one or more health awareness microservices.

13. The computer program product of claim 8 wherein the received telemetry data includes a tagged telemetry data packet.

14. The computer program product of claim 8 wherein the received telemetry data is configured to exercise one or more of the health check microservices and/or one or more of the health awareness microservices.

15. A computing system including a hardware processor and memory configured to perform operations comprising:

receiving of telemetry data from the storage system, wherein the telemetry data includes, at least in part, data related to at least one of availability and unavailability of a storage device;

processing the telemetry data via one or more health check microservices;

analyzing the telemetry data via the one or more health check microservices, wherein analyzing the telemetry data comprises analyzing one or more of one or more hardware components of the storage system, one or more RAID groups of the storage system, one or more storage pools of the storage system, and a connectivity status of a host configured to the storage system; and processing the analyzed telemetry data via one or more health awareness microservices to generate one or more health awareness results concerning the storage system.

16. The computing system of claim 15 further configured to perform operations comprising:

receiving a plurality of untagged telemetry data portions from the storage system.

17. The computing system of claim 16 wherein 2 wherein further comprising:

tagging an untagged telemetry data portion, chosen from the received plurality of untagged telemetry data portions, to generate a tagged telemetry data portion.

18. The computing system of claim 16 further comprising:

tagging a fictional telemetry data portion to generate a tagged telemetry data portion.

19. The computing system of claim 15 further configured to perform operations comprising:

comparing the one or more health awareness results to one or more anticipated results to assess the functionality of the one or more health check microservices and/or the one or more health awareness microservices.

20. The computing system of claim 15 wherein the received telemetry data includes a tagged telemetry data packet.

21. The computing system of claim 15 wherein the received telemetry data is configured to exercise one or more of the health check microservices and/or one or more of the health awareness microservices.

\* \* \* \* \*